(12) United States Patent
Clavier et al.

(10) Patent No.: US 7,085,378 B1
(45) Date of Patent: Aug. 1, 2006

(54) COUNTERMEASURE METHOD IN AN ELECTRONIC COMPONENT USING A SECRET KEY CRYPTOGRAPHIC ALGORITHM

(75) Inventors: Christophe Clavier, Gemenos (FR); Olivier Benoit, Aubagne (FR)

(73) Assignee: GEMPLUS, Gemenos Cedex (FR)

( * ) Notice: Subject to any disclaimer, the term of this patent is extended or adjusted under 35 U.S.C. 154(b) by 0 days.

(21) Appl. No.: 09/807,615

(22) PCT Filed: Sep. 15, 1999

(86) PCT No.: PCT/FR99/02199

§ 371 (c)(1),
(2), (4) Date: Jul. 13, 2001

(87) PCT Pub. No.: WO00/24156

PCT Pub. Date: Apr. 27, 2000

(30) Foreign Application Priority Data

Oct. 16, 1998 (FR) .................................. 98 12990

(51) Int. Cl.
*H04L 9/00* (2006.01)

(52) U.S. Cl. .............................. 380/42; 380/29; 380/44; 380/259; 380/277; 380/30; 713/150; 713/156; 713/189; 726/22; 726/23

(58) Field of Classification Search ................... 380/42
See application file for complete search history.

(56) References Cited

U.S. PATENT DOCUMENTS 5,933,501 A * 8/1999 Leppek ....................... 380/259

6,182,216 B1 * 1/2001 Luyster ....................... 713/168
6,246,768 B1 * 6/2001 Kim ............................. 380/28
6,278,783 B1 * 8/2001 Kocher et al. ............... 380/277
6,891,950 B1 * 5/2005 Oomori et al. ............... 380/44

FOREIGN PATENT DOCUMENTS

FR           2672402 A      8/1992      .................. 712/300

OTHER PUBLICATIONS

Miyaguchi, S., "Secret Key Ciphers that Change the Encipherment Algorithm Under the Control of the Key", NTT Review, vol. 6, No. 4, Jul. 4, 1994, pp. 85-90.

Yi, Xun et al., "A Method for Obtaining Cryptographically Strong 8×8 S-boxes", IEEE Global Telecommunications Conference, Phoenix, Arizona, Nov. 3-8, 1997, vol. 2, Nov. 3, 1997, pp. 689-693.

* cited by examiner

*Primary Examiner*—Syed A. Zia
(74) *Attorney, Agent, or Firm*—Buchanan Ingersoll PC

(57) ABSTRACT

The invention concerns a countermeasure method in an electronic component using a secret key K cryptographic algorithm with sixteen computing cycles to supply an encrypted message (C) from an input message (M), each cycle using first means $TC_0$ to supply an output information from an input information, Said method consists in applying by selection a sequence with the first means or another sequence with other means $TC_1$, $TC_2$ to a group G1 comprising the first three cycles at least and another group G4 comprising the last three cycles at least. Whatever the sequence, the output result of the last cycle of each group is the same for the same input message (M).

13 Claims, 13 Drawing Sheets

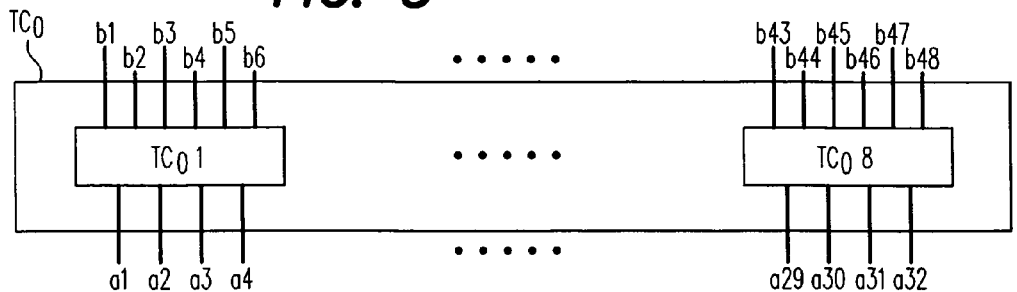
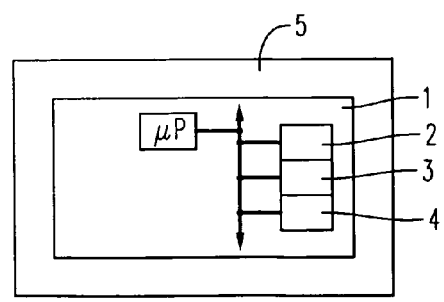

COUNTERMEASURE METHOD IN AN ELECTRONIC COMPONENT USING A SECRET KEY CRYPTOGRAPHIC ALGORITHM

This disclosure is based upon, and claims priority from French Application No. 98/12990, filed on Oct. 16, 1998 and International Application No. PCT/FR99/02199, filed Sep. 15, 1999, which was published on Apr. 27, 2000 in a language other than English, the contents of which are incorporated herein by reference.

BACKGROUND OF THE INVENTION

The present invention relates to a countermeasure method in an electronic component using a secret key cryptography algorithm. They are used in applications where access to services or data is strictly controlled. They have an architecture formed around a microprocessor and memories, including a program memory which contains the secret key.

These components are notably used in chip cards, for certain applications thereof. These are for example applications involving access to certain data banks, banking applications, remote payment applications, for example for television, petrol dispensing or passing through motorway tolls.

These components or cards therefore use a secret key cryptography algorithm, the best known of which is the DES (standing for Data Encryption Standard in the British and American literature) algorithm. Other secret key algorithms exist, such as the RC5 algorithm or the COMP128 algorithm. This list is of course not exhaustive.

In general terms and briefly, the function of these algorithms is to calculate an encoded message from a message applied as an input (to the card) by a host system (server, banking dispenser etc) and the secret key contained in the card, and to supply this encoded message in return to the host system, which for example enables the host system to authenticate the component or card, to exchange data, etc.

However, it has become clear that these components or cards are vulnerable to attacks consisting of a differential analysis of the current consumption and which enable ill-intentioned third parties to find the secret key. These attacks are referred to as DPA attacks, the English acronym for Differential Power Analysis.

The principle of these DPA attacks is based on the fact that the current consumption of the microprocessor executing the instructions varies according to the data being manipulated. Notably, an instruction from the microprocessor manipulating a data bit generates two different current profiles depending on whether this bit is "1" or "0". Typically, if the instruction is manipulating a "0", there is at this time of execution a first amplitude of the current consumed and if the instruction is manipulating a "1", there is a second amplitude of the consumed current, different from the first.

The characteristics of the cryptography algorithms are known: the calculations made, the parameters used. The only unknown is the secret key contained in the program memory. This cannot be derived solely from knowledge of the message applied as an input and the encoded message supplied in return.

However, in a cryptography algorithm, some calculated data depend only on the message applied in clear to the input of the card and the secret key contained in the card. Other data calculated in the algorithm can also be recalculated solely from the encoded message (generally supplied in clear at the output of the card to the host system) and the secret key contained in the card. More precisely, each bit of these particular data can be determined from the input or output message, and a limited number of particular bits of the key.

Thus, to each bit of a particular data item, there corresponds a sub-key formed by a particular group of bits of the key.

The bits of these particular data which can be predicted are hereinafter referred to as target bits.

The basic idea of the DPA attack is thus to use the difference in current consumption profile of an instruction depending on whether it is manipulating a "1" or a "0" and the possibility of calculating a target bit by means of the instructions of the algorithm using a known input or output message and a hypothesis on the corresponding sub-key.

The principle of the DPA attack is therefore to test a given sub-key hypothesis, applying, to a large number of current measurement curves, each relating to a known input message of the attacker, a Boolean selection function, a function of the sub-key hypothesis, and defined for each curve by the value predicted for a target bit.

By making an assumption on the sub-key concerned, it is in fact possible to predict the value "0" or "1" which this target bit will take for a given input or output message.

It is then possible to apply, as a Boolean selection function, the value, "0" or "1", predicted by the target bit for the sub-key hypothesis in question, in order to sort these curves into two packets: a first packet contains the curves which have seen the manipulation of the target bit at "0" and a second packet contains the curves which have seen the manipulation of the target bit at "1" according to the sub-key hypothesis. By taking the mean of the current consumption in each packet, a mean consumption curve $M0(t)$ is obtained for the first packet and a mean consumption curve $M1(t)$ for the second packet.

If the sub-key hypothesis is correct, the first packet actually contains all the curves amongst the N curves which have seen the manipulation of the target bit at "0" and the second packet actually contains all the curves amongst the N curves which have seen the manipulation of the target bit at "1". The mean consumption curve $M0(t)$ of the first packet will then have a mean consumption everywhere except at the times of execution of the critical instructions, with a current consumption profile characteristic of the manipulation of the target bit at "0" (profile$_0$). In other words, for all these curves, all the manipulated bits have had as many chances of equalling "0" as of equalling "1", except the target bit, which has always had the value "0". Which can be written:

$$M0(t)=[\text{profile}_0+\text{profile}_1)/2]_{t \neq tci}+[\text{profile}_0]_{tci}$$

that is to say $$M0(t)=[Vm_t]_{t \neq tci}+[\text{profile}_0]tci$$

where tci represents the critical instants, at which a critical instruction has been executed.

Likewise, the mean consumption curve $M1(t)$ of the second packet corresponds to a mean consumption everywhere except at the times of execution of the critical instructions, with a current consumption profile characteristic of the manipulation of the target bit at "1" (profile$_1$). It is possible to write:

$$M1(t)=[\text{profile}_0+\text{profile}_1)/2]_{t \neq tci}+[\text{profile}_1]_{tci}$$

that is to say $$M1(t)=[Vm_t]_{t \neq tci}+[\text{profile}_1]tci$$

It has been seen that the two profiles, $profile_0$ and $profile_1$, are not equal. The difference between the curves $M0(t)$ and $M0(1)$ then gives a signal DPA(t), whose amplitude is equal to $profile_0-profile_1$ at the critical instants tci of execution of the critical instructions manipulating this bit, that is to say, in the example depicted in FIG. 1, at the places tc0 to tc6, and whose amplitude is approximately equal to zero outside the critical instants.

If the sub-key hypothesis is false, the sorting does not correspond to reality. Statistically, there is then in each packet as many curves which have actually seen the manipulation of the target bit at "0" as there are curves which have seen the manipulation of the target bit at "1". The resulting mean curve $M0(t)$ is then situated around a mean value given by $(profile_0+profile_1)/2=Vm$, since, for each of the curves, all the bits manipulated, including the target bit, have as many chances of equalling "0" as of equalling "1".

The same reasoning on the second packet leads to a mean current consumption curve $M1(t)$ whose amplitude is situated around a mean value given by $(profile_0+profile_1)/2=Vm$.

The signal $DP(t)$ supplied by the difference $M0(t)-M1(t)$ is in this case substantially equal to zero. The signal DPA(t) in the case of a false sub-key hypothesis is shown in FIG. 2.

Thus the DPA attack exploits the difference in the current consumption profile during the execution of an instruction depending on the value of the bit manipulated, in order to effect a sorting of current consumption curves according to a Boolean selection function for a given sub-key hypothesis. By effecting a differential analysis of the mean current consumption between the two packets of curves obtained, an information signal DPA(t) is obtained.

A DPA attack then consists overall in:
 a—drawing N random messages (for example N equal to 1000);
 b—having the algorithm executed by the card for each of the N random messages, reading the current consumption curve each time (measured on the supply terminal of the component);
 c—making an assumption on a sub-key;
 d—predicting, for each of the random messages, the value taken by one of the target bits whose value depends only the bits of the message (input or output) and on the sub-key taken as a hypothesis, in order to obtain the Boolean selection function;
 e—sorting the curves according to this Boolean selection function (that is to say according to the value "0" or "1" predicted for this target bit for each curve under the sub-key hypothesis);
 f—calculating, in each packet, the resulting mean current consumption curve;
 g—taking the difference between these mean curves, in order to obtain the signal DPA(t).

If the hypothesis on the sub-key is correct, the Boolean selection function is correct and the curves of the first packet actually correspond to the curves for which the message supplied as an input or output gave a target bit at "0" in the card and the curves in the second packet actually correspond to the curves for which the message applied as an input or output gave a target bit at "1" in the card.

Take the case in FIG. 1: the signal DPA(t) is therefore not zero at times tc0 to tc6 corresponding to the execution of the critical instructions (those which manipulate the target bit). It suffices for there to have been at least one critical instant in the period of acquisition.

It should be noted that the attacker does not need to know precisely the critical instants.

If the sub-key hypothesis is not correct, the sorting does not correspond to reality and there are then in each packet as many curves corresponding in reality to a target bit at "0" as there are curves corresponding to a target bit at "1". The signal DPA(t) is substantially zero everywhere (the case shown in FIG. 2). It is necessary to return to step c—and to make a new assumption on the sub-key.

If the hypothesis proves correct, it is possible to pass to the evaluation of other sub-keys, until the key has been reconstituted to the maximum possible extent. For example, with a DES algorithm, a key of 64 bits is used, of which only 56 are useful bits. With a DPA attack, it is possible to reconstitute at least 48 bits of the 56 useful bits.

SUMMARY OF THE INVENTION

The purpose of the present invention is to use, in an electronic component, a countermeasure method which gives rise to a zero signal DPA(t), even where the sub-key hypothesis is correct.

In this way, nothing makes it possible to distinguish the case of the correct sub-key hypothesis from the false sub-key hypotheses. By means of this countermeasure, the electronic component is protected against DPA attacks.

According to the invention, the countermeasure method makes the target bits, that is to say the data manipulated by critical instructions, unpredictable.

This is because, because of the countermeasure, for each message applied as an input, a target bit manipulated by a critical instruction takes the value 0 or 1 with equal probability. In each packet of curves which the attacker will make under a given sub-key hypothesis, by means of the Boolean selection function which he will have calculated, there will be as many curves actually having manipulated a target bit "0" as there are curves actually having manipulated a target bit at "1". The signal DPA(t) will always be zero, whether the sub-key hypothesis is correct or not.

In the invention, the concern is more particularly with the DES cryptography algorithm.

Such an algorithm comprises sixteen identical calculation rounds.

In such an algorithm, it has been possible to show that the data which can be predicted by an attacker are situated at the first round and at the last round, and that the critical instructions, in the sense of the DPA attack, are situated in the first three rounds and the last three rounds.

In the invention, a means of making unpredictable the data manipulated by these critical instructions in the first three and last three rounds, whilst obtaining the correct encoded message as an output, has in particular been sought.

One aim of the invention is therefore to make the data manipulated by the critical instructions unpredictable, whilst obtaining the correct final result (encoded message C).

One solution to these different technical problems has been found in the formation of a group (G1) comprising at least the first three rounds and another group (G4) comprising at least the last three rounds, and in the use of these groups of means for making unpredictable the data manipulated by the critical instructions contained in these rounds.

According to the invention, the results output from each group are correct.

As characterised, the invention therefore relates to a countermeasure method in an electronic component using a secret key cryptographic algorithm for calculating an encoded message from an input message, the use of the algorithm comprising sixteen calculation rounds, each round using first means for supplying an output data item from an input data item, the output data item and/or the derived data being manipulated by critical instructions in the first three and last three rounds. According to the invention, a group is formed comprising at least the first three rounds and another group comprising at least the last three rounds, and with each of these groups there is associated a first sequence using the first means in each round and a second sequence using other means in certain rounds at least, the said first and second sequences being such that they supply the same result at the output from the last round in each group for the same given input message, the choice of the sequence to be executed in the groups concerned being a function of a statistical half probability distribution, in order to make all the data manipulated by the said critical instructions unpredictable.

In one embodiment, four groups each of four consecutive rounds are formed.

In another embodiment, two groups are formed, comprising respectively the first three and the last three rounds.

BRIEF DESCRIPTION OF THE DRAWINGS

Other characteristics and advantages of the invention are detailed in the following description given for information and in no way limitatively, and with reference to the accompanying drawings, in which:

FIG. 5 is a block diagram of the operation SBOX used in the DES algorithm;

FIG. 6 shows an example of an elementary table of constants with one input and one output used in the operation SBOX;

FIGS. 9 and 10 depict respectively second and third elementary tables of constants used in the invention;

FIG. 16 depicts a third elementary table of constants used in this fourth mode of application of the invention;

FIG. 18 depicts a simplified block diagram of a chip card containing an electronic component in which the countermeasure method according to the invention is implemented.

DETAILED DESCRIPTION

Figure 1:
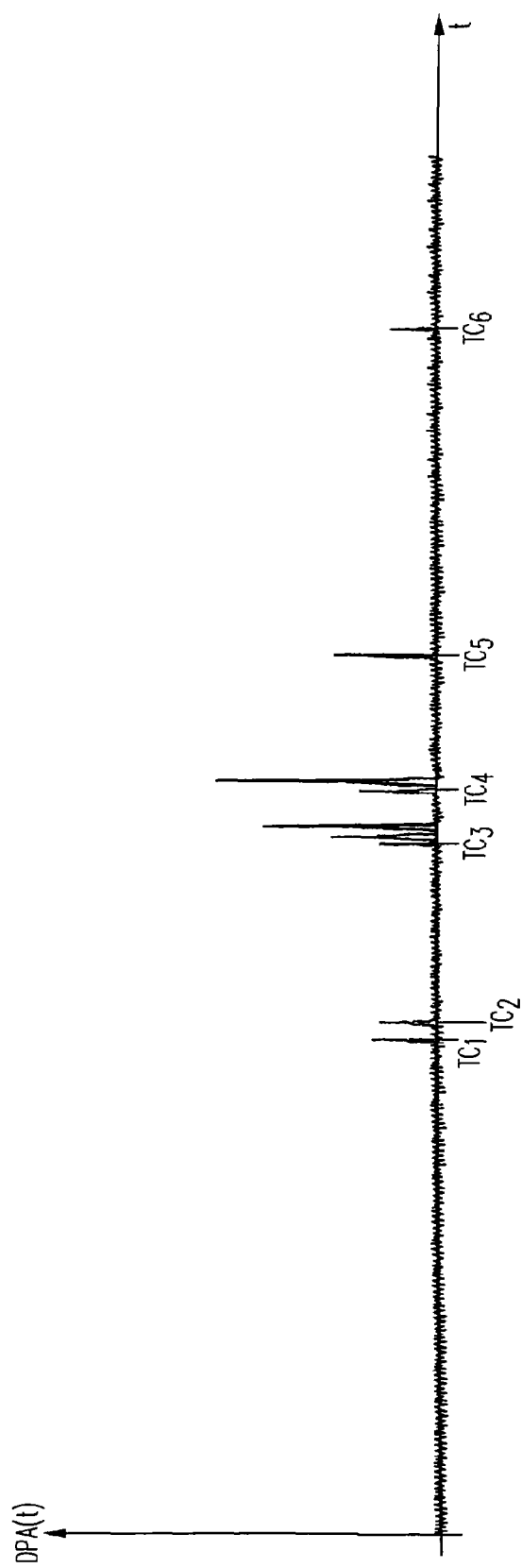
FIGS. 1 and 2, already described, depict the signal DPA(t) which can be obtained as a function of a hypothesis on a sub-key of the secret key K, according to a DPA attack.
Figure 2:
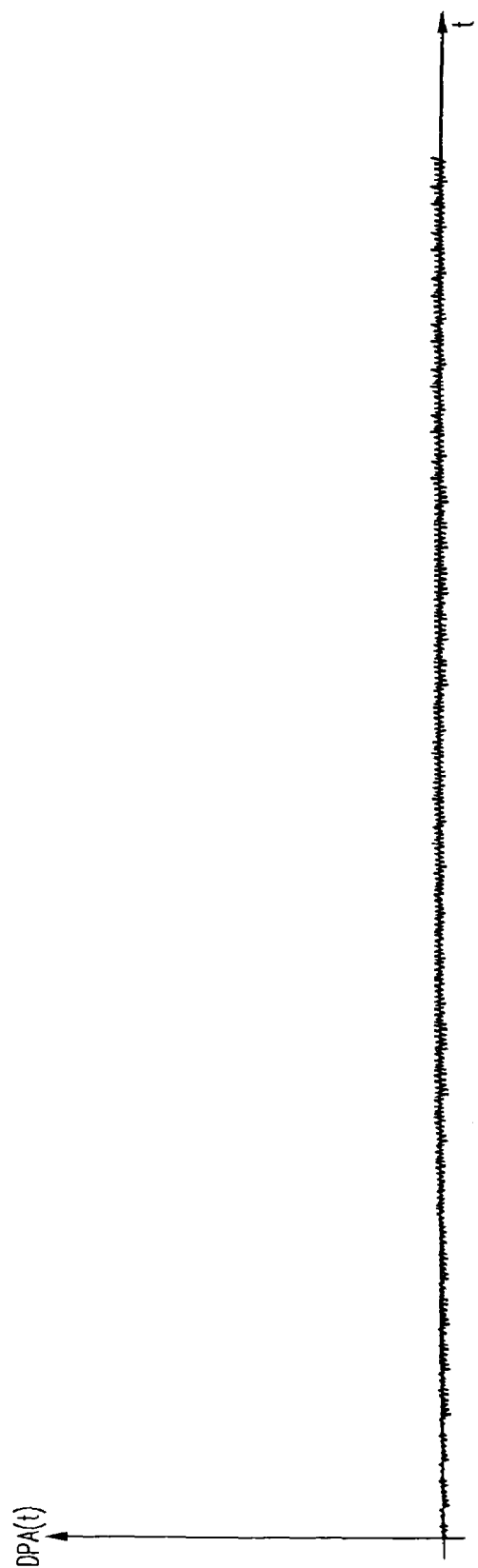
Figure 3:
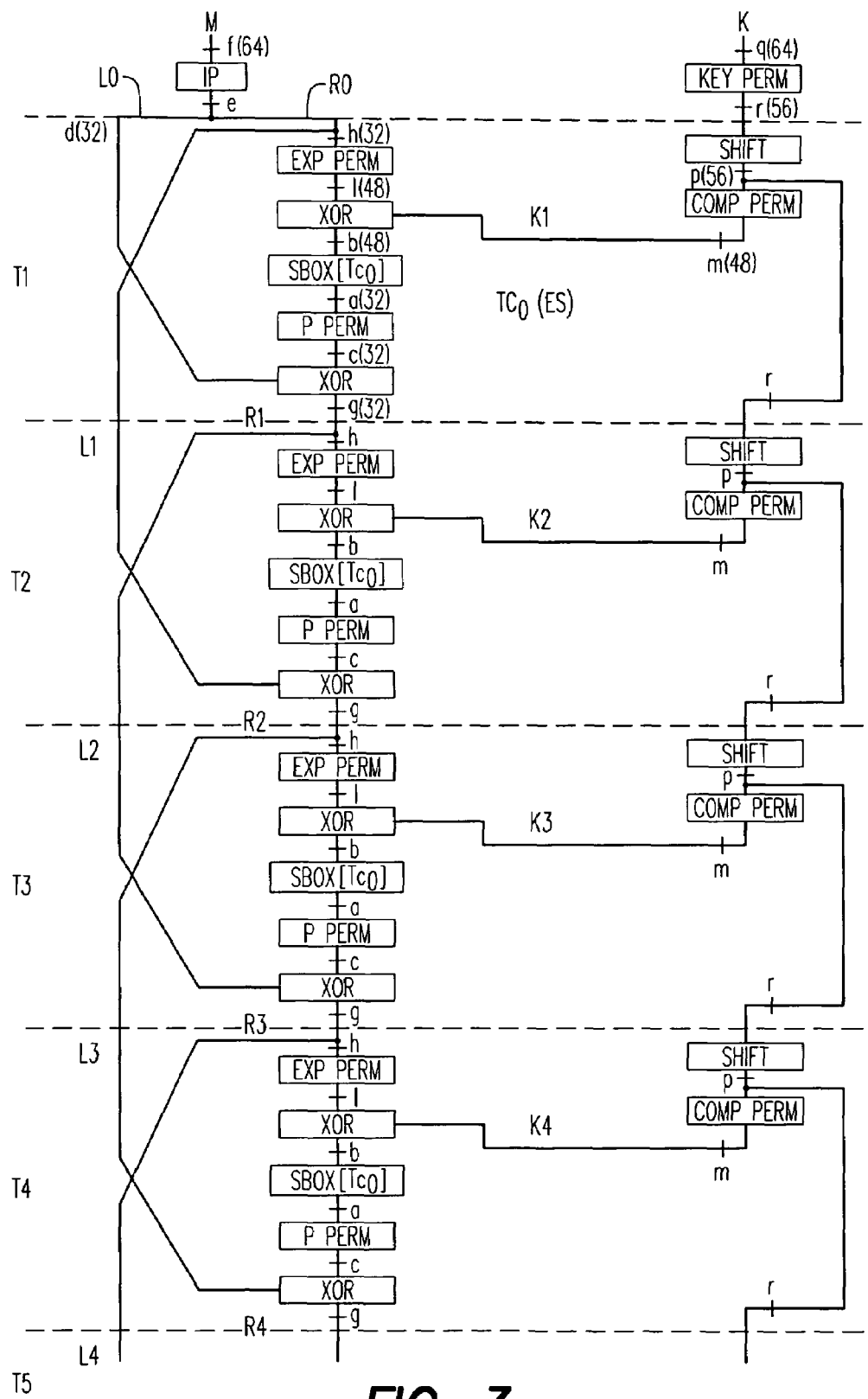
FIGS. 3 and 4 are flow diagrams depicting the first rounds and the last rounds of the DES algorithm.
Figure 4:
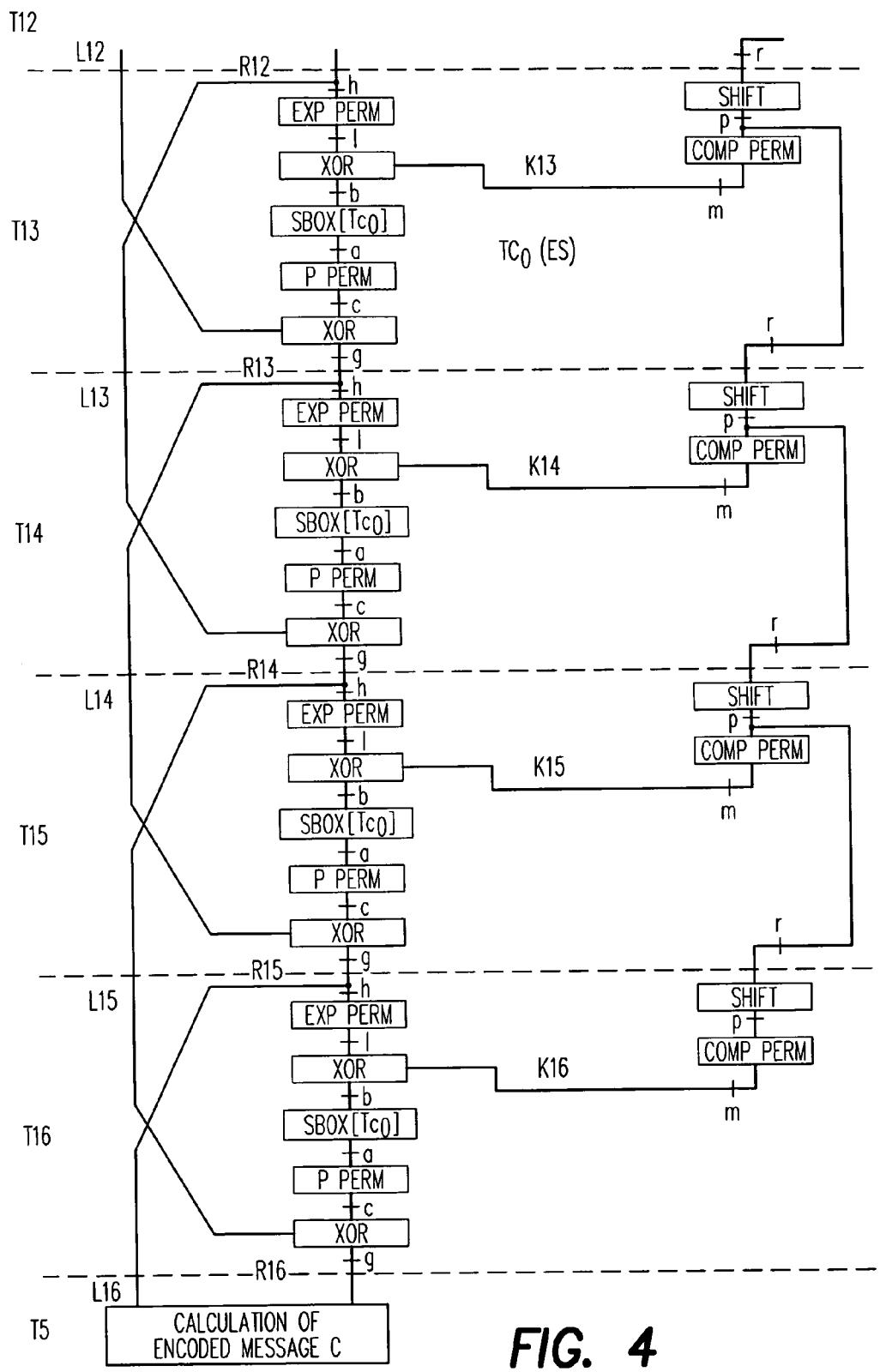

The DES secret key cryptographic algorithm (hereinafter the term DES or DES algorithm will more simply be used) contains 16 calculation rounds, denoted T1 to T16, as depicted in FIGS. 3 and 4.

The DES begins with an initial permutation IP on the input message M (FIG. 3). The input message M is a word f of 64 bits. After permutation, a word e of 64 bits is obtained, which is divided into two in order to form the input parameters L0 and R0 of the first round (T1). L0 is a word d of 32 bits containing the 32 most significant bits of the word e. R0 is a word h of 32 bits containing the 32 least significant bits of the word e.

The secret key K, which is a word q of 64 bits, itself undergoes a permutation and compression in order to supply a word r of 56 bits.

The first round comprises an operation EXP PERM on the parameter R0, consisting of an expansion and a permutation, in order to supply a word l of 48 bits as an output.

This word l is combined with a parameter K1, in an operation of the exclusive OR type denoted XOR, in order to supply a word b of 48 bits. The parameter K1, which is a word m of 48 bits, is obtained from the word r by a shift by one position (the operation denoted SHIFT in FIGS. 3 and 4) followed by a permutation and a compression (the operation denoted COMP PERM).

The word b is applied to an operation denoted SBOX, at the output of which a word a of 32 bits is obtained. This particular operation will be explained in more detail in relation to FIGS. 5 and 6.

The word a undergoes a permutation P PERM, giving as an output the word c of 32 bits.

This word c is combined with the input parameter L0 of the first round T1, in a logic operation of the exclusive OR type, denoted XOR, which supplies the word g of 32 bits as an output.

The word h (=R0) of the first round supplies the input parameter L1 of the following round (T2) and the word g of the first round supplies the input parameter R1 of the following round. The word p of the first round supplies the input r of the following round.

Other rounds T1 to T16 take place in a similar fashion, except with regard to the shift operation SHIFT, which takes place on one or two positions according to the rounds in question.

Each round Ti thus receives as an input the parameters Li−1, Ri−1 and r and supplies as an output the parameters Li and Ri and r for the following round Ti+1.

At the end of the DES algorithm (FIG. 4), the encoded message is calculated from the parameters L16 and R16 supplied by the last round T16.

This calculation of the encoded message C comprises in practice the following operations:

formation of a word e' of 64 bits by reversing the position of the words L16 and R16, and then concatenating them;

application of the permutation $IP^{-1}$ which is the reverse of that of the start of the DES, in order to obtain the word f' of 64 bits forming the encoded message C.

The operation SBOX is detailed in FIGS. 5 and 6. It comprises a table of constants $TC_0$ for supplying an output data item a as a function of an input data item b.

In practice, this table of constants $TC_0$ is in the form of eight elementary tables of constants $TC_01$ to $TC_08$, each receiving as an input only 6 bits of the word b, in order to supply only 4 bits of the word a as an output.

Thus the elementary table of constants $TC_01$ depicted in FIG. 6 receives, as an input data item, the bits b1 to b6 of the word b and supplies as an output data item the bits a1 to a4 of the word a.

In practice these eight elementary tables of constants $TC_01$ to $TC_08$ are stored in the program memory of the electronic component.

In the operation SBOX of the first round T1, a particular bit of the output data item a of the table of constants $TC_0$ depends on only 6 bits of the data item b applied as an input, that is to say only 6 bits of the secret key K and the input message (M).

In the operation SBOX of the last round T16, a particular bit of the data item a output from the table of constants $TC_0$ can be recalculated from only six bits of the secret key K and the encoded message (C).

However, if the principle of the DPA attack is repeated, if a bit of the output data item a is chosen as the target bit, it suffices to make an assumption on 6 bits of the key K, in order to predict the value of a target bit for a given input (M) or output (C) message. In other words, for the DES, it suffices to make an assumption on a sub-key of 6 bits.

In a DPA attack on such an algorithm for a given target bit, it is therefore necessary to distinguish one correct sub-key hypothesis amongst 64 possible ones.

Thus, by taking only eight bits of the word a as target bits (one output bit per elementary table of constants $TC_01$ to $TC_08$), it is possible to discover up to 6×8=48 bits of the secret key, by making DPA attacks on each of these target bits.

In the DES, critical instructions in the sense of DPA attacks are therefore found at the start of the algorithm and at the end.

At the start of the DES algorithm, the data which can be predicted from an input message M and from a sub-key hypothesis are the data a and g calculated in the first round (T1).

The data item a from the first round T1 (FIG. 3) is the output data item from the operation SBOX of the round in question. The data item g is calculated from the data item a, by permutation (P PERM) and exclusive OR operation with the input parameter L0.

In fact, the data item c of the first round is a data item derived from the data item a of the first round. The derived data item c corresponds to a simple permutation of bits of the data item a.

The data item 1 of a given round is a data item derived from the data item g of the previous round, since it corresponds to a permutation of the bits of the word g, certain bits of the word g also being duplicated.

Knowing a and g, it is also possible to know these derived data.

The critical instructions of the start of the algorithm are the critical instructions which manipulate either the data item which can be predicted, such as the data item a of the first round, or a derived data item.

The critical instructions manipulating the data item a of the first round T1 or the derived data item c are thus the instructions for the end of the operation SBOX, of the operation P PERM and the start of the operation XOR of the first round T1.

The critical instructions manipulating the data item g or the derived data are all the instructions of the end of the operation XOR of the end of the first round T1 as far as the instructions for the start of the operation SBOX of the second round T2, and the start of the XOR operation at the end of the third round T3 (L2=h(T2)=g(T1)).

At the end of the DES algorithm, the data which can be predicted from an encoded message C and a sub-key hypothesis are the data item a of the sixteenth round T16 and the data item L15 equal to the word h of the fourteenth round T14.

The critical instructions manipulating the data item a of the sixteenth round or derived data are the instructions of the sixteenth round of the end of the operation SBOX, of the permutation operation P PERM and of the start of the operation XOR.

For the data item L15, the critical instructions manipulating this data item or derived data are all the instructions from the instructions of the end of the operation XOR of the fourteenth round T14, up to the instructions for the start of the operation SBOX of the fifteenth round T15, plus the instructions for the start of the operation XOR of the sixteenth round T16.

The countermeasure method according to the invention applied to this DES algorithm consists of having, for each critical instruction, as many chances for the critical instruction to manipulate a data item as its complement. Thus, whatever the target bit on which the DPA attack can be made, there are as many chances for the critical instructions manipulating this bit to manipulate a "1" or a "0".

In practice, this must be true for each of the potential target bits: in other words, the attacker having a choice between several possible attacks, that is to say between several possible Boolean selection functions for effecting a sorting of curves, for a given sub-key hypothesis, the implementation of the countermeasure method according to the invention must ensure that the data manipulated by each of the critical instructions randomly take, half of the time, a value or its complement. With regard to the application of the countermeasure method according to the invention to the DES algorithm, it is therefore necessary to apply the countermeasure to the critical instructions for the start of the DES and to the critical instructions for the end of the DES, in order to be completely protected.

In the DES, all the data manipulated by critical instructions are an output item or data derived from an output data item from an operation SBOX.

This is because, at the start of the DES, the data which can be predicted are the data a and g of the first round T1. The data item a is the output data item of the operation SBOX of the first round. The data item g is calculated from the data item a, since g=P PERM(a) XOR L0. g is therefore a data item derived from the output data item a of the operation SBOX of the first round. Thus all the data manipulated by the critical instructions of the start of the DES result directly or indirectly from the output data item a of the operation SBOX of the first round.

With regard to the end of DES, the data which can be predicted are the data item a of the sixteenth round T16 and the data item g of the fourteenth round T14, g being equal to L15.

The data item a is the output data item of the operation SBOX of the sixteenth round T16.

As for the data item L15, this is calculated, in the normal execution of the DES algorithm, from the output data item a of the operation SBOX of the fourteenth round T14: L15=P PERM(a) XOR L14.

If the output data a of these particular operations SBOX are made unpredictable, all the derived data are also made unpredictable: all the data manipulated by the critical instructions of the DES algorithm are therefore made unpredictable. If it is considered that these operations SBOX constitute first means for supplying an output data item S=a from an input data item E=b, the countermeasure method applied to the DES algorithm consists of using other means for making the output data item unpredictable, so that this output data item and/or derived data manipulated by the critical instructions are all unpredictable.

According to the invention, a group formed by at least the first three rounds and another group formed by at least the last three rounds are formed. These groups therefore contain all the rounds comprising the critical instructions.

With these two groups there is associated a first sequence using the first means for all the rounds and a second sequence using the other means for at least some rounds.

In the other rounds which are not in these groups, it is possible to continue to use the first means.

The use of these other means is such that the output result, that is to say the encoded message, remains correct.

These other means can comprise several different means. They are such that they make the complemented data item correspond to one or other or both data items amongst the input and output data of the first means.

Thus, considering a large execution number, the groups will use the first sequence, which is the normal sequence of the algorithm, on average half of the time, and the other sequence half of the time. The data manipulated by the critical instructions in these groups, corresponding to certain intermediate results, will therefore on average be complemented half of the time. On a large number of curves there will therefore be statistically as many chances that a given target bit will be at 1 or at 0.

Figure 7:
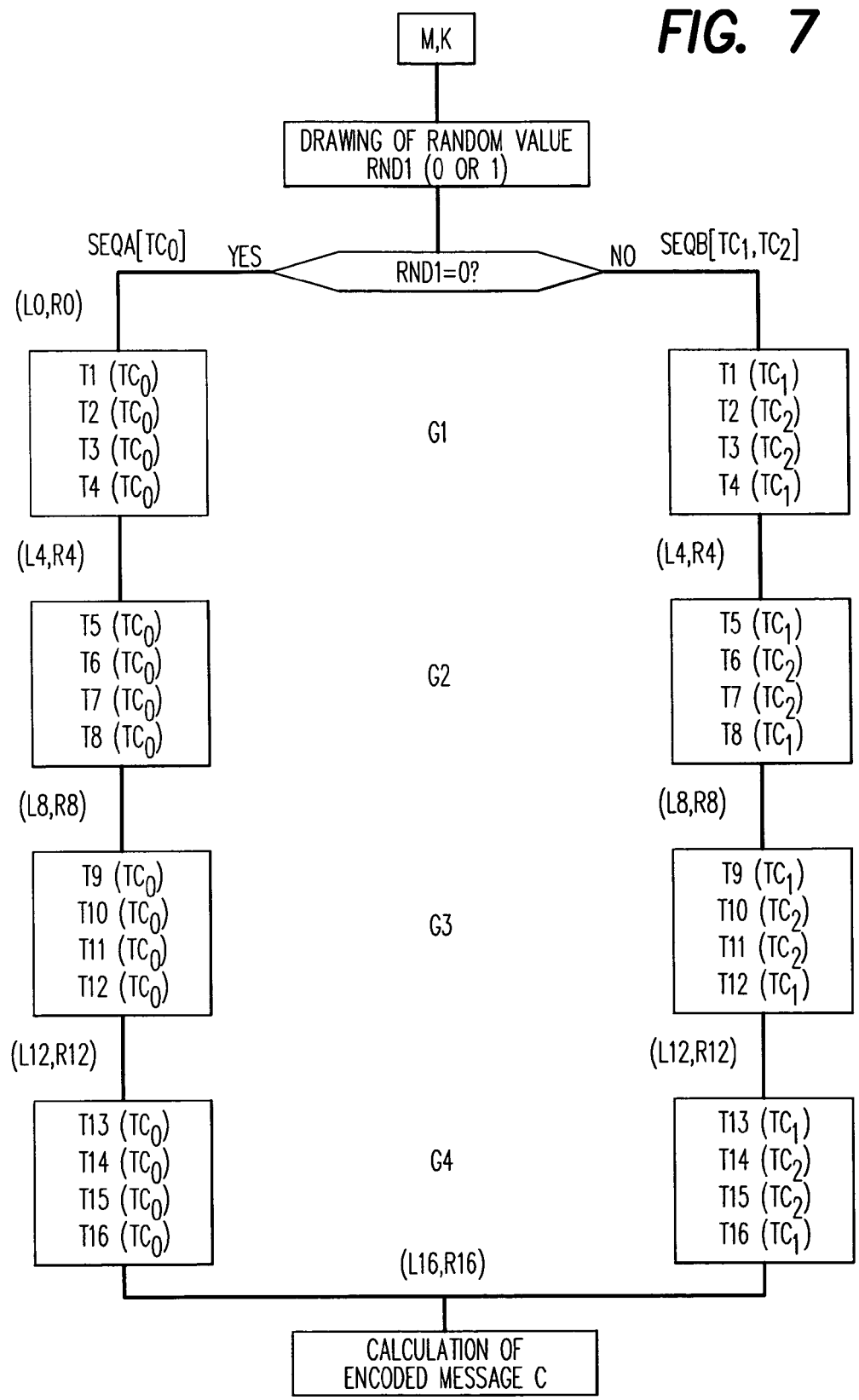
FIG. 7 shows a first example of a flow diagram for executing the DES with a countermeasure method according to the invention.

FIG. 7 depicts a first embodiment of the invention.

In this embodiment, the sixteen rounds of the DES algorithm are divided into four groups G1 to G4 of four successive rounds. The group G1 thus comprises the rounds T1 to T4, the group G2 the rounds T5 to T8, the group G3 the rounds T9 to T12 and the group G4 the rounds T13 to T16.

Two sequences are associated with each group. A first sequence SEQA consists of using the first means $TC_0$ for each round. A second sequence SEQB consists of using other means for at least some rounds.

In the example depicted, these other means comprise second means $TC_2$ and third means $TC_1$.

The second means $TC_2$ are used in the second round and the penultimate round of each group; that is to say in T2, T3 of G1, T6, T7 of G2, T10, T11 of G3 and T14 and T15 of G4.

The third means $TC_1$ are used in the first round and last round of each group. That is to say in T1, T4 of G1, T5, T8 of G2, T9, T12 of G3 and T13, T16 of G4.

In practice, these different means are tables of constants. The first means correspond to the first table of constants $TC_0$, corresponding to the normal execution of the DES. The other means $TC_1$ and $TC_2$ are defined with respect to this first table of constants $TC_0$, by complementation.

The second means $TC_2$ are such that, for the complement /E of the input data item E, they supply the complement of the output data item S of the first means $TC_0$. One example of a second elementary table $TC_2 1$ corresponding to the first elementary table of constants $TC_0 1$ is depicted in FIG. 9. It should be noted that the notation of the complement /E used in the text, corresponds the notation with a bar above the complemented data item in the drawings.

The third means are such that, for the input data item E, they supply the complement /S of the output data item S of the first means $TC_0$. One example of a third elementary table $TC_1 1$ corresponding to the first elementary table of constants $TC_0 1$ is depicted in FIG. 10.

The calculation program then consists, at the start of the execution of the algorithm, in drawing a random value RND1 equal to 0 or to 1, and then testing this value RND1. In the example, if RND1 is equal to 1, the calculation is made using the second sequence SEQB for each group G1 to G4.

If RND1 is equal to 0, the calculation is made using the first sequence SEQA for each group.

Whether the first or second sequence is used, the correct result for the output parameters is obtained at the output of each group. Thus the output parameters L4 and R4 of the first group G1, L8 and R8 of the second group G2, L12 and R12 of the third group G3, L16 and R16 of the fourth group G4 are correct whatever the sequence used.

When all the rounds have been executed, the correct parameters L16 and R16, which will make it possible to calculate the correct encoded message C, are obtained.

Figure 8:
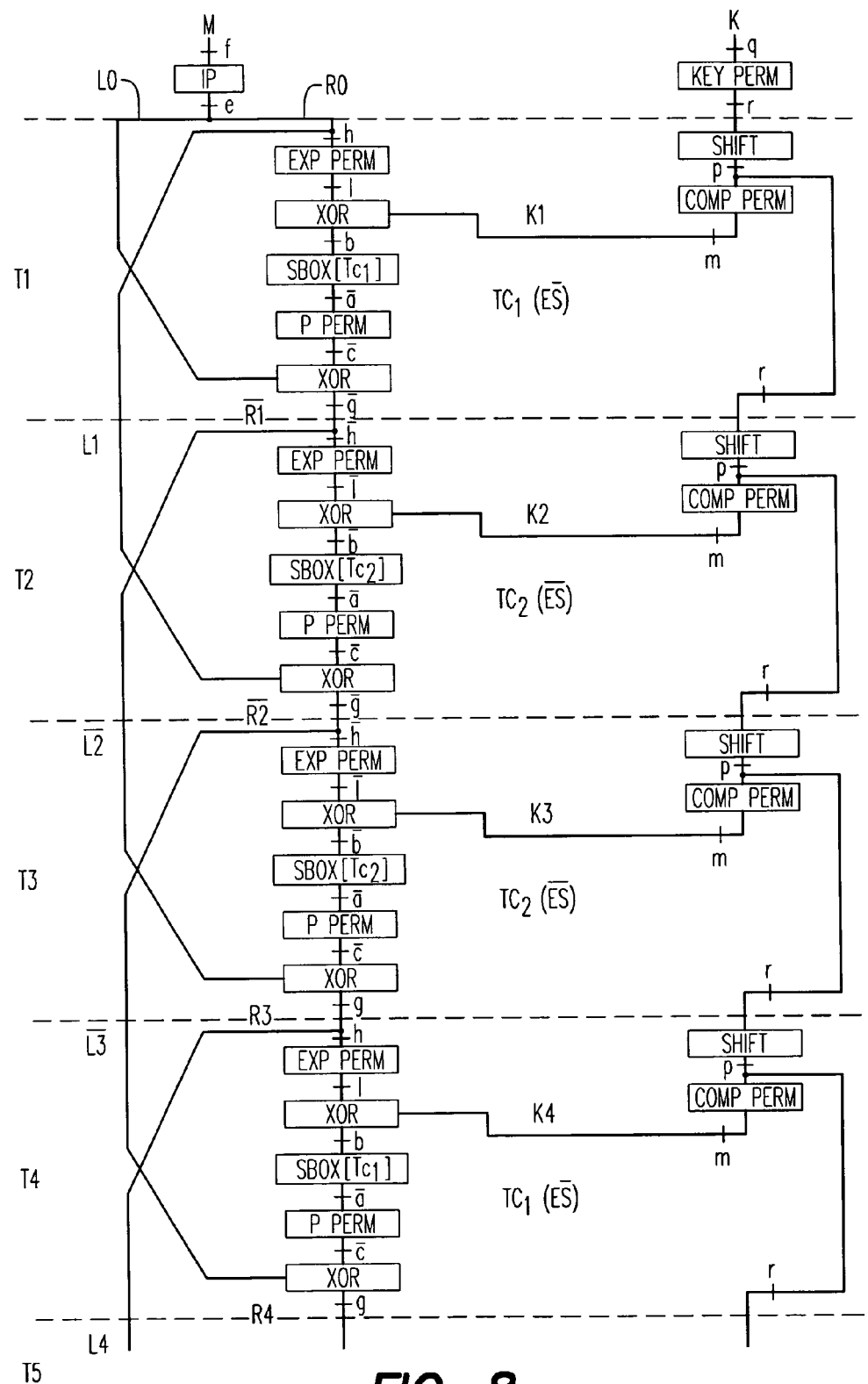
FIG. 8 is a flow diagram of the first rounds of the DES according to a second sequence of the countermeasure method according to the first example depicted in FIG. 7.

On the other hand, within the groups, certain intermediate results do not have the same values according to the sequence used, but complementary values, as will be shown with reference to FIGS. 3 and 8.

FIG. 3, already described, corresponds in fact to the flow diagram for calculating the four rounds T1, T2, T3 and T4 of the first group G1, in the first sequence SEQA.

FIG. 8 shows the detailed flow diagram of the four rounds T1, T2, T3 and T4 of the first group G1, in the second sequence SEQB.

In the second sequence, the round T1 uses the third means $TC_1$. At the output of the operation SBOX, the data item /a (FIG. 8) is therefore obtained, instead of the data item a with the first sequence SEQA (FIG. 3).

The operation P PERM of the round T1, which is a simple permutation, will therefore also supply as an output a complemented data item /c with respect to the sequence SEQA.

The data item g, which is obtained by an exclusive OR between a complemented data item /c and a non-complemented data item L0, will also supply as an output a complemented data item /g.

Thus, with the third means of the round T1, all the following complemented data are obtained, with respect to the data which would be obtained with the sequence SEQA:

in the round T1: /a, /c, /g;
in the round T2: /R1, /h, /l, /b;
in the round T3: /L2.

The second means $TC_2$ used in the round T2 are then arrived at. According to their definition, by applying the complemented data item /b, the complemented data item /a is obtained as an output. By taking this reasoning as far as the end of the round T4, noting that an exclusive OR between two complemented data gives a non-complemented result (for example /L3 XOR /c=g in the round T4), the non-complemented data L4, R4 are obtained at the output of the round T4.

In addition, it is found that, for all the critical instructions for the start of the DES, the critical instructions will manipulate, in a random manner according to the data item RND1, the data or their complements depending on whether the sequence executed is the first SEQA or the second SEQB.

The countermeasure method, in this first embodiment, is therefore of great interest. It requires only two additional operations in the DES calculation program, the drawing of the random value and the testing of this value. The program memory for its part must contain the three different means used, that is to say the three tables of constants $TC_0$, $TC_1$, $TC_2$.

Returning to FIG. 7, it can be noted that there is no need for a countermeasure in the groups in the middle G2 and G3, since they do not contain any critical instructions within the meaning of a DPA attack. It would therefore be possible to apply the countermeasure method with its two sequences SEQA and SEQB only to the first and second groups G1 and G4. It would suffice to apply the first sequence SEQA systematically to groups G2 and G3.

However, applying the countermeasure method to all the groups gives consistency to the whole.

Thus the two sequences SEQA and SEQB are preferably associated with each of the groups G1 to G4.

Figure 11:
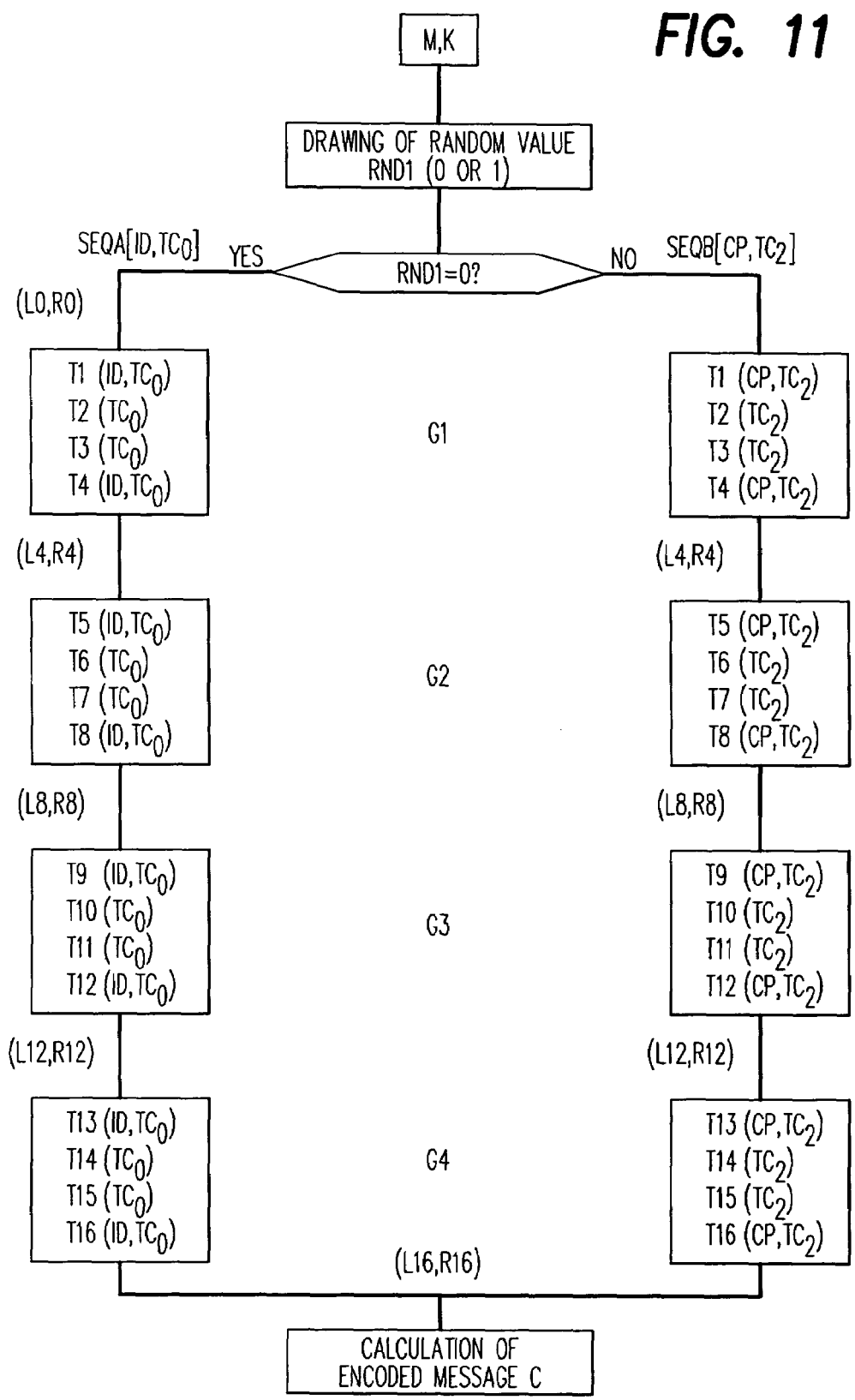
FIG. 11 depicts a second example of a flow diagram for executing the DES with a countermeasure method according to the invention.

A second embodiment of the countermeasure method according to the invention is depicted in FIG. 11. This second embodiment is in fact a variant of the first. The advantage of this variant is using, as other means in the sequence SEQB, only the second means $TC_2$. This is because it has been seen that the different means $TC_0$, $TC_1$, $TC_2$ correspond in practice to tables of constants each comprising eight elementary tables of constants, which occupies a not insignificant amount of space in the program memory.

Figure 12:
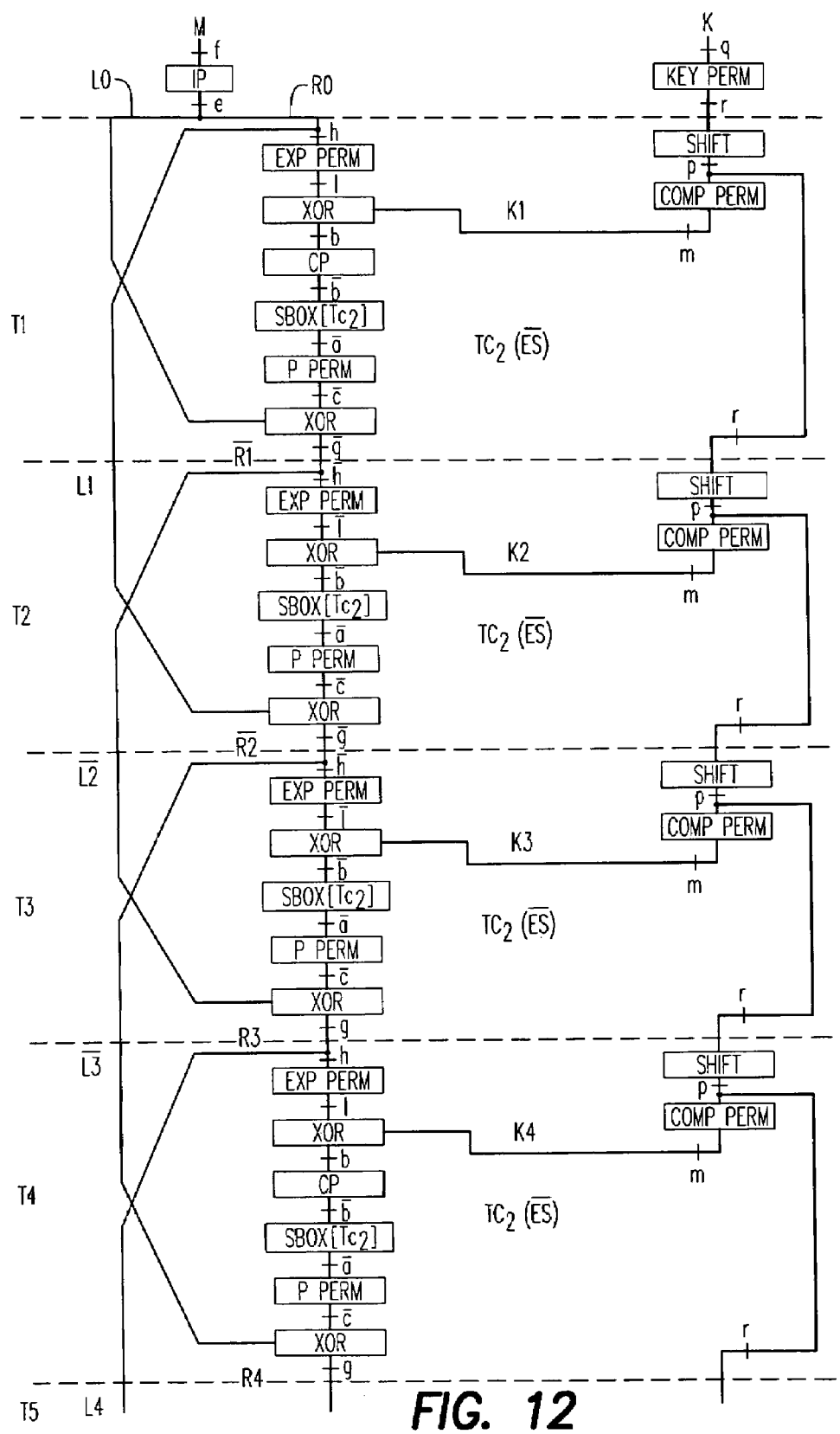
FIGS. 12 and 13 are flow diagrams of the first DES rounds respectively according to the second sequence and the first sequence of the countermeasure method according to the second example depicted in FIG. 11.

This variant therefore consists in using the two means $TC_2$ in the sequence SEQB. For this, an additional operation CP, for complementing the input data item applied to the second means, is provided in the program for calculating the first and second rounds of each group. This additional operation CP is in practice an exclusive OR of the input data item with logic ones. If reference is made to FIG. 12 depicting the detailed flow diagram of the second sequence SEQB for calculating the four rounds T1 to T4 of the first group G1, it is a case of complementing the data item b before applying it to the input of the operation SBOX of the rounds T1 and T4. As the second means TC2 complement the input, the complementation operation CP plus the second means $TC_2$ are equivalent to the third means $TC_1$ used in the first embodiment of the invention, that is to say to a data item which is not complemented at the input.

However, for the countermeasure method according to the second embodiment to be effective, it is necessary for the number of instructions to be exactly the same whatever the calculation sequence used. This is because, if any difference existed between the two possible sequences SEQA and SEQB, there would then be a possibility of a successful DPA attack.

Figure 13:
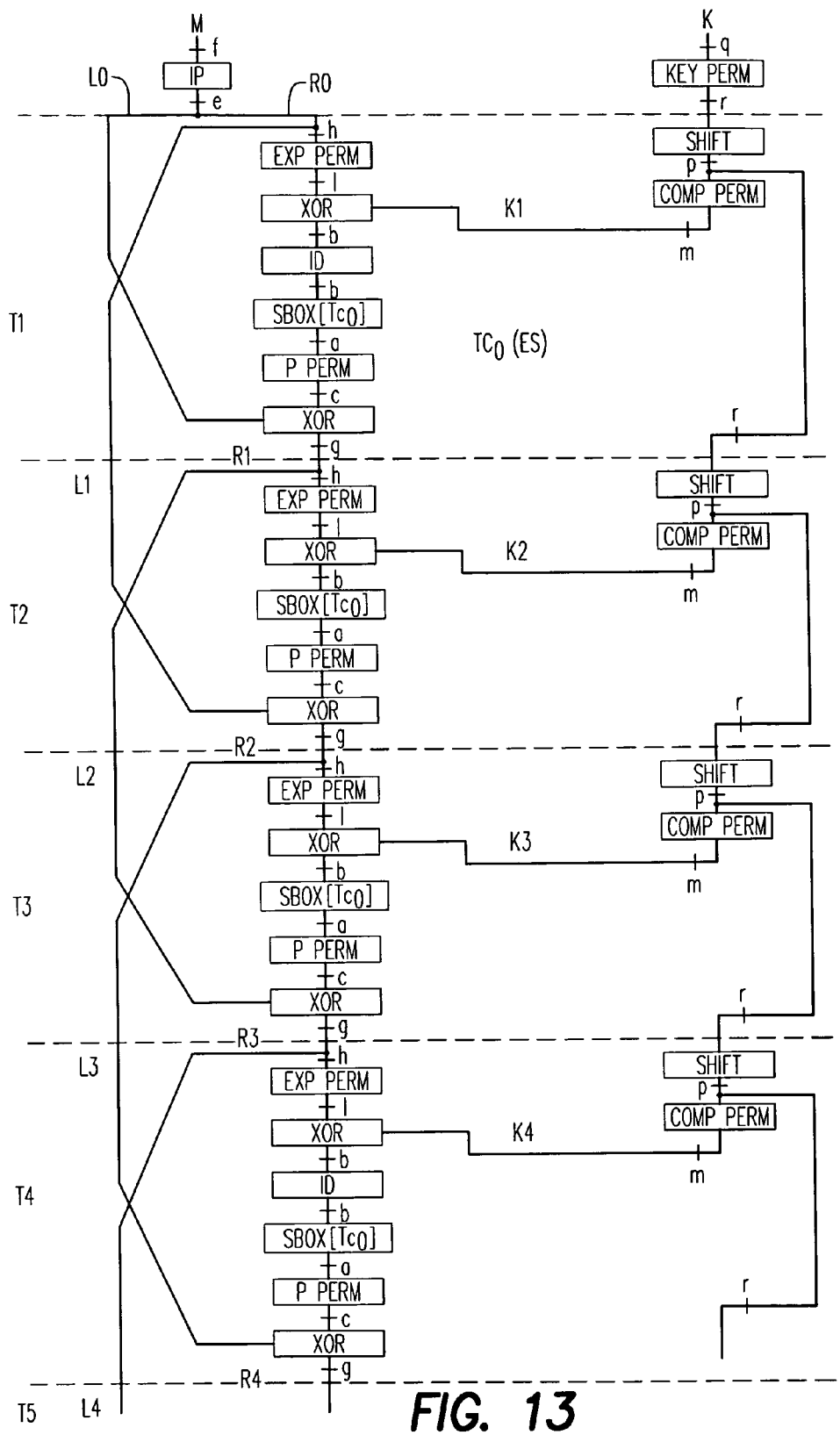

For this reason, and as depicted in FIG. 13, there is provided, in the rounds T1 and T4 of the first sequence SEQA, an operation ID of copying identically, which consists of an exclusive or with logic zeros at the input of the operation SBOX, in order not to modify the input data item whilst applying the same instructions as for the additional operation CP.

In this way, there are the same number of instructions in the two sequences.

Figure 14:
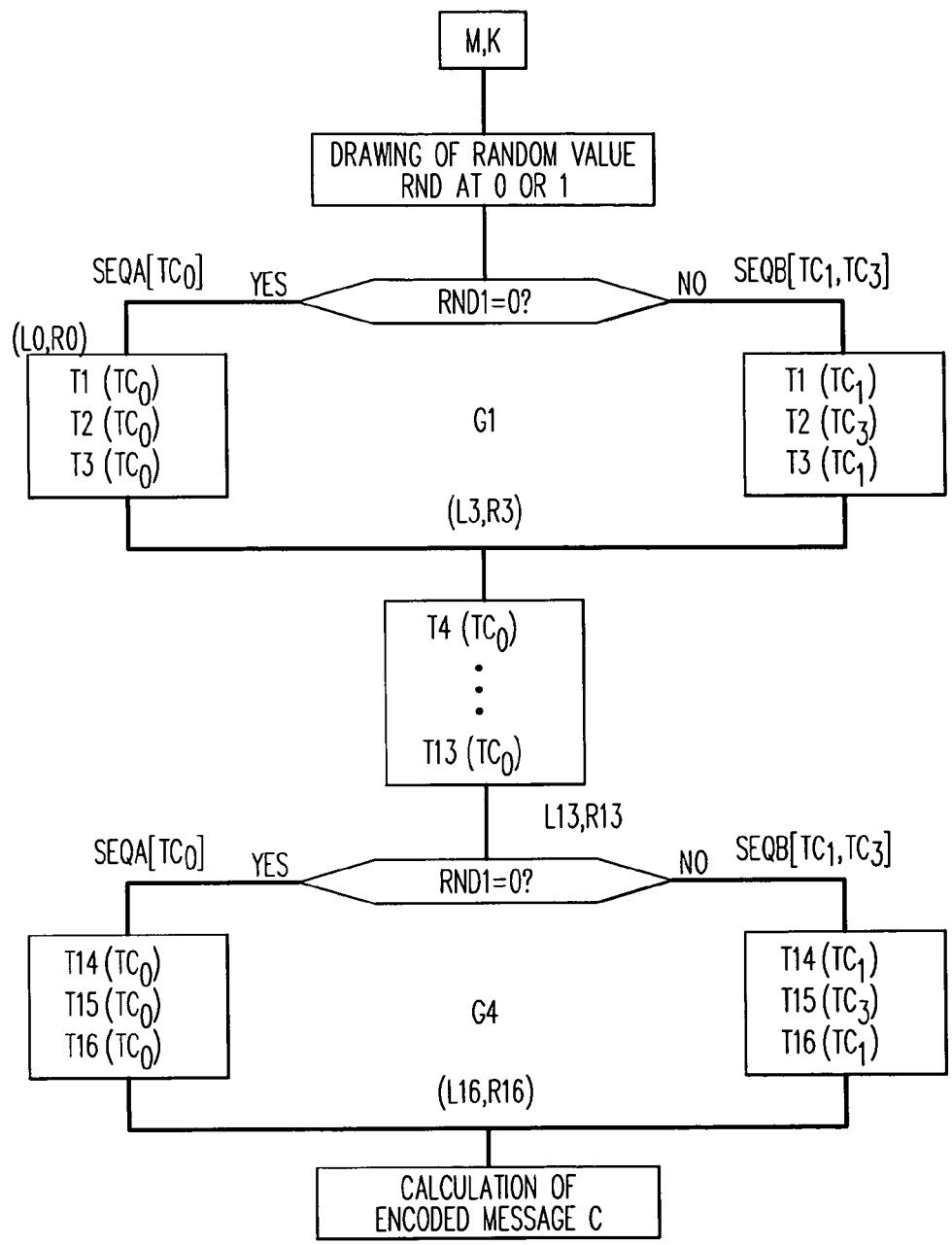
FIGS. 14 and 15 are flow diagrams relating to a third mode of applying the countermeasure method according to the invention.

FIG. 14 depicts a third embodiment of the countermeasure method according to the invention.

In this embodiment, a first group G1 is formed with the first three rounds T1, T2, T3 and another group G4 with the last three rounds T14, T15, T16. There is associated with each group a first sequence SEQA using the first means $TC_0$ for each round and a second sequence using other means for at least some rounds.

At the output of each group G1, G4, the correct output result L3, R3 and L16, R16 is obtained, whatever the sequence SEQA or SEQB used.

The other means are, in the example, the third means $TC_1$ already seen in relation to the first embodiment and the fourth means $TC_3$.

These fourth means $TC_3$ are defined, with respect to the first means $TC_0$, as making the output data item S correspond to the complement /E of the input data item E. A corresponding elementary table of constants $TC_31$ is depicted in FIG. 16.

For the other rounds not included in the groups, that is to say for the rounds T4 to T13, the first means $TC_0$ are applied.

Thus, after having drawn the random value RND1, this value is tested in order to determine the sequence to be applied to the first group, and the output continues with the parameters L3, R3 calculated, the following rounds being executed with the first means $TC_0$. At the end of the round T13, the sequence determined by the random value RND1 is applied to the group G4. The parameters L16, R16 are obtained, which will serve to calculate the encoded message C.

Figure 15:
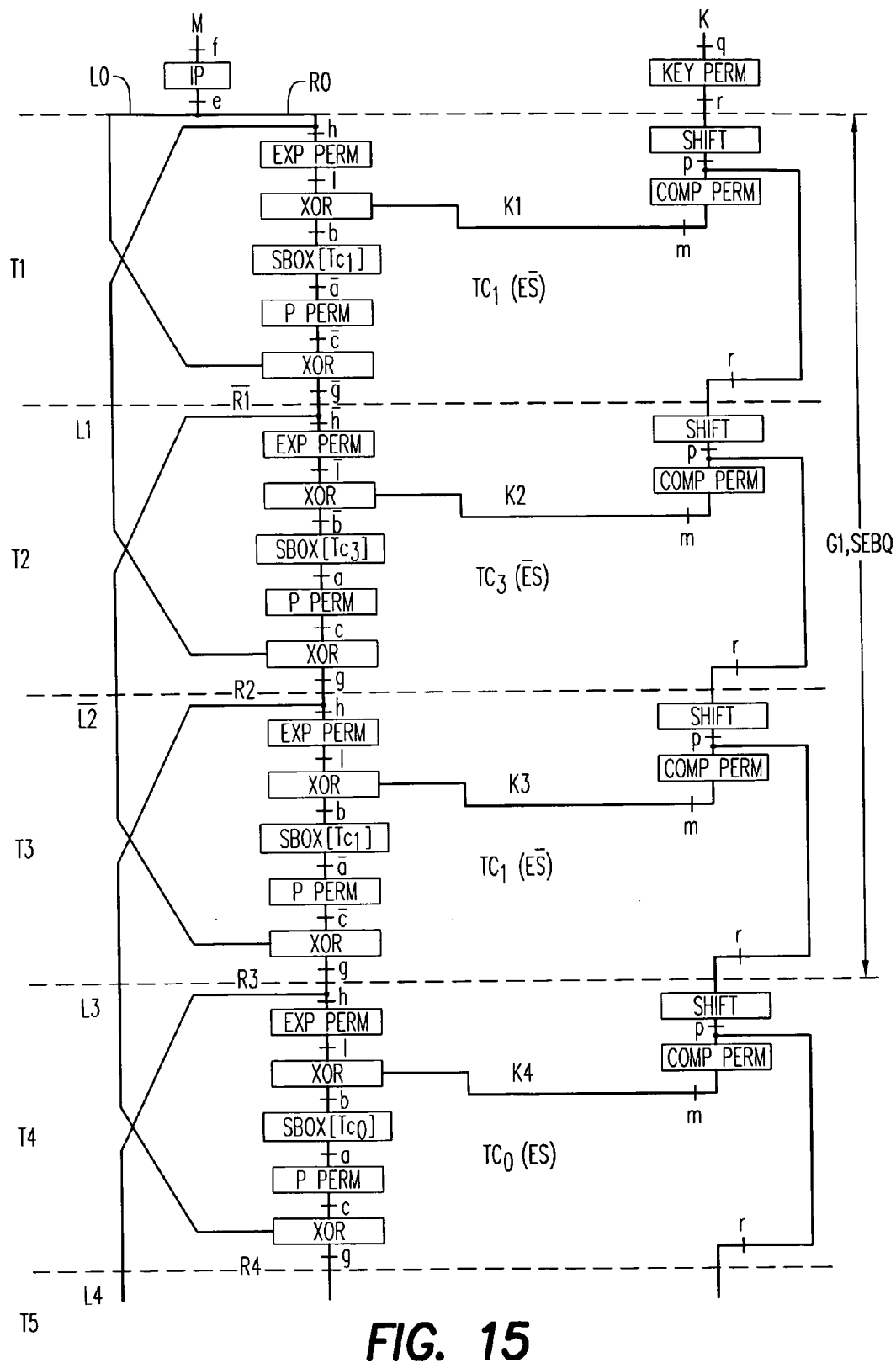

FIG. 15 is a corresponding detailed flow diagram, for the second sequence SEQB.

It is clear from this flow diagram that complemented data are obtained (the complementation being denoted by a bar above the data item) for all the critical instructions of these rounds. And the data L3 and R3 at the output of the third round are not complemented. The execution of the algorithm can be continued by passing to the round T4, at which the first means $TC_0$ are applied according to the normal execution of the algorithm.

In this figure, it can be remarked that, in the operation SBOX of the third round T3 it would be possible to use the first means $TC_0$ instead of the third means $TC_1$, providing an additional complementation operation CP at the output of the operation SBOX. This is an equivalent solution.

It is then necessary to make the additional operation of identical copying ID in the sequence SEQA correspond to this additional complementation operation in the sequence SEQB.

Figure 17:
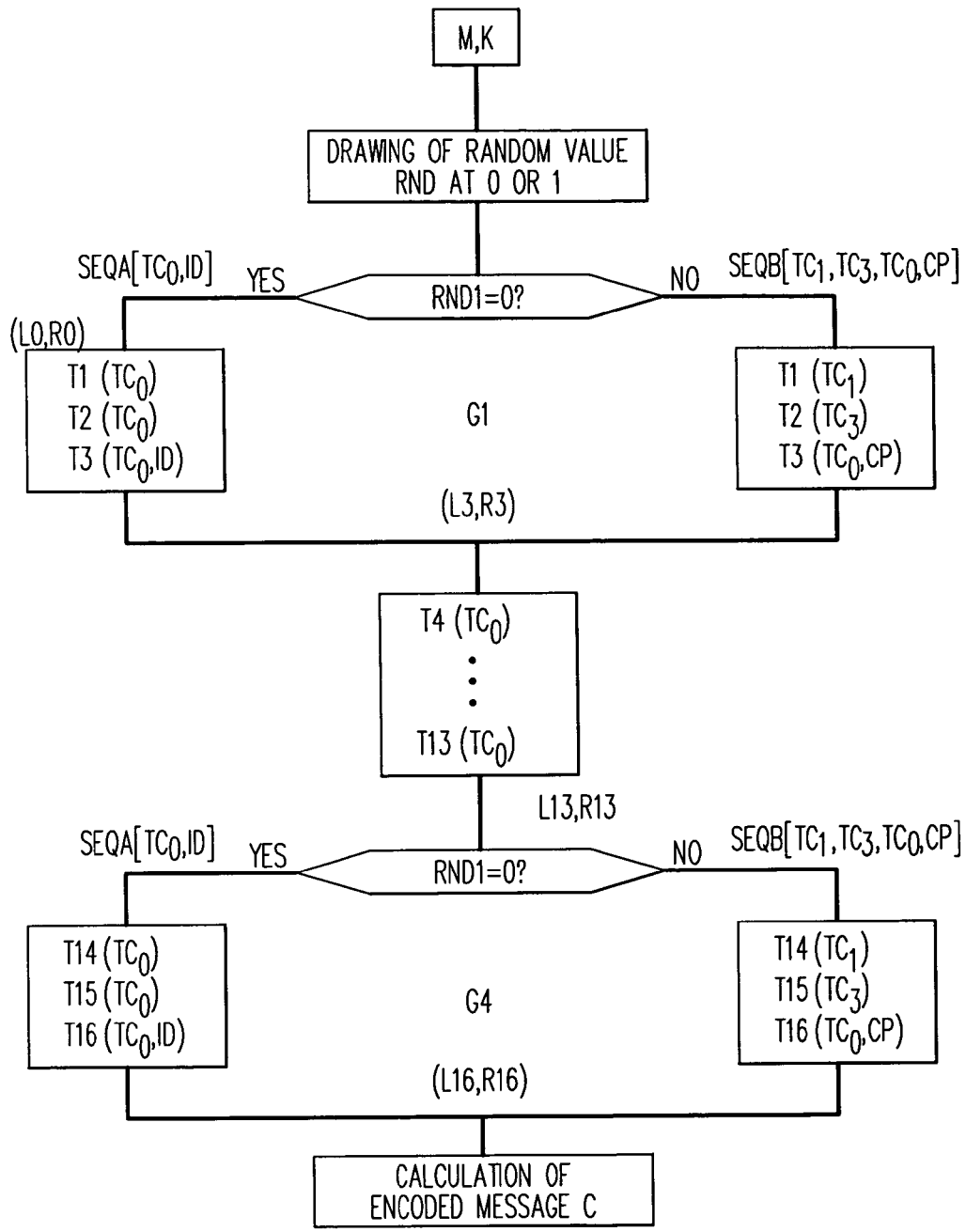
FIG. 17 depicts a flow diagram for execution of the DES according to a variant of the third mode of application of the countermeasure method according to the invention.

FIG. 17 depicts an execution flow diagram using this variant. For the third round in the two groups G1 and G4, in the first sequence SEQA, the first means $TC_0$ are used, followed at the output by the additional copying operation ID, which is denoted T3 ($TC_0$, ID). In the second sequence SQB, for the third round the first means $TC_0$ are used, followed at the output by the additional complementation operation CP, which is denoted T3 ($TC_0$, CP).

Thus the second embodiment and this variant of the third embodiment show the use of additional operations at the input or output of the different means.

To each additional complementation operation CP in the second sequence there then corresponds an additional operation of identical copying ID in the first sequence SEQA.

The present invention applies to the DES secret key cryptography algorithm, for which several examples of non-limitative applications have been described. It applies more generally in a secret key cryptography algorithm with sixteen calculation rounds, the critical instructions of which are situated amongst the situations of the first three or last three rounds.

A electronic component 1 using a countermeasure method according to the invention in a DES secret key cryptography algorithm typically comprises, as shown in FIG. 18, a microprocessor μP, a program memory 2 and a working memory 3. In order to be able to manage the use of the different means $TC_0$, $TC_1$, $TC_2$ according to the invention, which are, in practice, tables of constants stored in the program memory, means 4 of generating a random value between 0 and 1 are provided which, if reference is made to the flow diagrams in FIGS. 7 and 11, supply the value of RND1 at each execution of the DES. Such a component can in particular be used in a chip card 5, for improving their resistance to tampering.

The invention claimed is:

1. A countermeasure method in an electronic component using a secret key cryptographic algorithm for calculating an encoded message from an input message, of the type in which sixteen calculation rounds are employed where each round supplies an output data item from an input data item, and the output data item is manipulated by critical instructions in at least the first three and last three rounds, said method including the following steps:

forming a group comprising at least the first three rounds and another group comprising at least the last three rounds, in each of these groups selectively applying a first sequence that uses a first manipulating means for said critical instructions in each round or a second sequence that uses other manipulating means for said critical instructions at least in certain rounds, said first and second sequences being such that they supply the same result at the output from the last round in each group for the same given input message, and selecting the sequence to be executed in the groups as a function of a statistical half probability distribution, in order to make the data manipulated by said critical instructions unpredictable.

2. A countermeasure method according to claim 1, wherein each of said manipulating means produces output data in accordance with input data, and wherein said other manipulating means are such that they complement at least one or both of the input and/or output data of the first manipulating means.

3. A countermeasure method according to claim 2, wherein said second sequence comprises, for one or more rounds, an additional complementation operation at the input or output of the manipulating means used, and wherein said first sequence includes an additional operation of identical copying that corresponds to each additional complementation operation in said second sequence.

4. A countermeasure method according to claim 1, wherein four groups of each of four successive rounds are formed, and wherein said first sequence is applied to each group and said second sequence is applied to at least the first group and the last group.

5. A countermeasure method according to claim 4, wherein second sequence is applied to each of the groups.

6. A countermeasure method according to claim 1, wherein the first group is formed by the first three rounds and the last group is formed by the last three rounds.

7. A countermeasure method according to claim 1, wherein the step of selecting the sequence to be executed is made at the start of execution of the algorithm by drawing a random value.

8. A countermeasure method according to claim 1, wherein said manipulating means are tables of constants.

9. An electronic security component have a countermeasure against attacks on a secret key cryptography technique in which data is manipulated by critical instructions, said component comprising:

a program memory having stored therein a plurality of manipulating means for use during said critical instructions, said manipulating means having complementary input and/or output data relative to one another; and means for generating a random value that designates at least one of said manipulating means to be employed during a given execution of said cryptography technique.

10. The electronic security component of claim 9, wherein said plurality of manipulating means each comprise a table of constants.

11. The electronic security component of claim 9, wherein said cryptography technique comprises a DES algorithm that is executed in multiple rounds.

12. The electronic security component of claim 11 wherein said random value has a first state which designates a manipulating means that is to be employed during all of the rounds of said algorithm, and a second state which designates at least two other manipulating means that are to be employed during different respective rounds of said algorithm.

13. The electronic security component of claim 9, wherein said component is a chip card.

* * * * *